United States Patent [19]

Maloney

[11] Patent Number: 5,038,892
[45] Date of Patent: Aug. 13, 1991

[54] LUBRICATION APPARATUS
[75] Inventor: Joseph J. Maloney, Hartsville, Ind.
[73] Assignee: Reliance Electric Company, Greenville, S.C.
[21] Appl. No.: 450,413
[22] Filed: Dec. 14, 1989

Related U.S. Application Data

[62] Division of Ser. No. 156,425, Feb. 16, 1988, Pat. No. 4,928,795.

[51] Int. Cl.$^5$ .............................................. F16N 27/00
[52] U.S. Cl. .................................... 184/7.4; 184/27.1; 184/37
[58] Field of Search ...................... 184/7.4, 6.11, 6.12, 184/27.1, 32, 37, 45.1, 45.2, 6, 6.1, 79, 105.2; 474/28; 464/7, 183

[56] References Cited

U.S. PATENT DOCUMENTS

| | | | |
|---|---|---|---|
| 1,803,456 | 5/1931 | Atwood | 184/27.1 |
| 2,068,392 | 1/1937 | Acker | 184/7.4 |
| 2,070,004 | 2/1937 | Davis | 184/27.1 |
| 3,458,010 | 7/1969 | Smithyman | 184/6 |
| 3,987,869 | 10/1976 | Bowers | 184/27.1 |
| 4,011,927 | 3/1977 | Smith | 184/26 |
| 4,774,918 | 10/1988 | Kurio et al. | 184/33 |
| 4,928,795 | 5/1990 | Maloney | 184/7.4 |

Primary Examiner—Ira S. Lazarus
Assistant Examiner—Alan B. Cariaso
Attorney, Agent, or Firm—Dority & Manning

[57] ABSTRACT

A standard grease fitting for the bore of a main shaft is replaced with an integral lube shaft rotatably supported within the main shaft bore with bearing assemblies. Snap rings hold two sealed bearings, spaced by a spacer element, against a stepped shoulder of the lube shaft, and axially position the lube shaft within the main shaft bore. Seals on the inboard side of the innermost bearing assembly prevent grease from escaping about the outside of the lube shaft. The rotatably mounted lube shaft permits lubrication of the main shaft even as it rotates. Grease may be manually applied, or remotely applied with a grease gun having a controlled, mechanized actuator. Flexible tubing interconnects the grease gun output with the lube shaft so that even readily inaccessible devices may be relatively remotely lubricated, even during their operation. An automatic timer, or other presetable control circuit may be used to automatically actuate the grease gun at timed intervals, or responsive to some other condition such as energization of the device to be lubricated. A sealable housing protects the automatic control circuitry, grease gun, and corresponding actuating mechanisms.

13 Claims, 3 Drawing Sheets

LUBRICATION APPARATUS

This is a division of application Ser. No. 07/156,425, filed Feb. 16, 1988, now U.S. Pat. No. 4,928,795.

BACKGROUND OF THE INVENTION

This invention concerns improved lubrication apparatus in general, and in particular apparatus for lubricating a device even during its operation, or for automatically and/or remotely lubricating a device.

Numerous conventional operative devices include drive members or other members mounted for rotation on a rotatable shaft. Such rotatable shaft may often be provided with a central, co-axial bore therein for receipt of grease. A conventional grease fitting or its equivalent may be secured at an exposed end of such rotatable shaft bore. Periodically, maintenance personnel may lubricate the bore of the rotatable shaft by introducing grease thereto through the grease fitting. However, such operation is labor intensive, and possesses other drawbacks.

For example, a given rotatable shaft to be lubricated may involve a drive application, such as the shafts which support variable discs for constant speed and variable speed assemblies on a mechanical adjustable speed drive. Examples of such drive are provided by U.S. Pat. No. 4,425,102 (Huff et al.); U.S. Pat. No. 4,411,590 (Meredith); and U.S. Pat. No. 4,384,863 (Huff et al.); all of which are commonly assigned with the present invention. For general disclosure purposes with respect to such mechanical adjustable speed drives, the disclosures of such patents are herein incorporated by reference.

Due to the size or configuration of a particular drive application at a given production facility, the grease fittings for such drive devices may be readily inaccessible by maintenance personnel, or even located in a relatively dangerous position. For example, where a particular drive is located at the top of a press assembly or underneath a conveyor, dis-incentives will be presented to any maintenance personnel charged with regularly lubricating such drive.

Moreover, in many commercial drive applications, the drive may need to be operative for hours, days, or even weeks at a time without interruption in support of its associated commercial process. Such drive demand can commonly dictate a need for a regular lubrication schedule. If the commercial activity is inherently dangerous, it may be necessary to halt production merely to permit maintenance personnel to perform routine or regular lubrication maintenance of the drives. Similarly, production must be stopped just for lubrication maintenance if it is impractical to apply grease to the grease fitting during continued operation of the device.

In addition to the foregoing circumstances, some drive applications (including some involving fairly continuous operation) may of necessity be situated in relatively isolated areas where maintenance personnel are not always present. For example, oil rigs (particularly those on off-shore platforms) may require routine visits by maintenance personnel, with one of their primary purposes being lubrication and other maintenance of drives operating otherwise continuously. In such circumstances, even simple lubrication of a conventional drive can be an expensive, and even dangerous, proposition.

SUMMARY OF THE INVENTION

The present invention recognizes and addresses such drawbacks, and other aspects of lubrication engineering. Accordingly, it is one of the general objects of this invention to provide improved lubrication apparatus. It is a more particular object to provide improved lubrication apparatus for lubricating a device, even during operation thereof. More specifically, present apparatus is intended to facilitate lubrication of a rotatable shaft, even during rotation thereof.

It is another more general object of the present invention to provide an improved lubrication apparatus which allows lubrication of a device from a relative distance (i.e., relatively remote from such lubrication apparatus). A more specific object is to provide an integral lube shaft within a main, rotatable shaft, which lube shaft accommodates relatively remote lubrication of the main shaft through tubes or equivalent means connected with the lube shaft.

Another general aspect of the present invention relates to elimination generally of the need for periodic maintenance functions by maintenance personnel. In accordance with such present aspect, one object is to provide automatic lubrication apparatus for achieving lubrication of a given device without requiring specific activity by maintenance personnel. Another present object is to provide such automatic lubrication apparatus in combination with the foregoing aspects of this invention accommodating remote lubrication of a given device (including, alternatively, even during operation thereof).

It is a more particular object of this invention to provide automatic lubrication apparatus which effects periodic lubrication of a given device for selected periods of time at predetermined intervals. It is a further object to provide such an apparatus which may alternatively be further responsive to environmental conditions, conditions of the given device to be lubricated, or other factors, for further automatically controlling lubrication of the given device.

Various embodiments in accordance with the present invention are directed to such present objects and aspects, as well as others. Furthermore, various presently disclosed features and aspects of this invention may be alternatively combined to provide various constructions and embodiments of this invention. One exemplary embodiment of this invention is directed to a lubrication apparatus for supplying lubrication to a main shaft supporting rotatable members thereon, such apparatus comprising a lube shaft having a central bore and respective input and output ends interconnected by the central bore, such lube shaft adapted for being received within the bore of a main shaft; and bearing means for rotatably supporting such lube shaft in such main shaft bore with such lube shaft input end remaining accessible for the application of grease thereto, whereby grease so applied may traverse the central bore for application to the main shaft via the lube shaft output end.

Another of the different exemplary embodiments in accordance with this invention concerns a remote lubrication system for use with grease fittings of devices to be lubricated, comprising reservoir means for holding grease, such reservoir means including at least one grease output from which grease flows whenever the reservoir means is actuated; controllable actuation means, operatively associated with the reservoir means, for selectively actuating the reservoir means; and grease conduit means adapted for conducting grease flowing from the reservoir means grease output to a grease fitting relatively remote therefrom; whereby a device having a grease fitting associated therewith may be selectively lubricated from a reservoir of grease located relatively remote therefrom.

Still further aspects of this invention are embodied in further constructions concerning an automatic lubrication system, comprising grease output means for outputting grease stored therein upon actuation thereof; actuation means for selectively actuating the grease output means responsive to a control signal input thereto; control timer means for outputting control signals to the actuation means at predetermined intervals, so as to actuate the grease output means for a given time at such intervals; and tubing means adapted for interconnecting grease output from the grease output means with a device to be lubricated, and which device is situated relatively remote from the grease output means, or to which device access is generally limited; wherein the length of the predetermined intervals may be selected with the control timer means so as to automatically lubricate a relatively remotely-located or limited-access device at desired intervals.

Another exemplary remote lubrication system constructed in accordance with this invention comprises grease fitting means adapted for association with the bore of a rotatable shaft for the application of grease thereto, such grease fitting means including a grease input which is relatively stationary even during rotation of such rotatable shaft; reservoir means for holding grease, and upon actuation thereof, for outputting such grease from a grease output thereof, such reservoir means being located relatively remote from the grease fitting means; actuation means operatively associated with the reservoir means for selectively actuating same; and tubing means for interconnecting the reservoir means grease output with the grease fitting means grease input; whereby a rotatable shaft may be relatively remotely lubricated, even during rotation thereof.

These and other objects, aspects, and features of this invention are more particularly discussed and described in the remainder of the specification. Various modifications and alterations to features, elements, and constructions disclosed herewith may occur to those of ordinary skill in the art, and are intended to come within the spirit and scope of this invention by virtue of present reference thereto. Such modifications and variations may include, but are not limited to, the substitution of functionally equivalent structures and elements for those expressly disclosed, illustrated, or suggested herewith, as well as the interchange of various features and elements (e.g. reversal of parts) presently disclosed.

BRIEF DESCRIPTION OF THE DRAWINGS

A full and enabling disclosure of the present invention, including the best mode thereof, to one of ordinary skill in the art is set forth more particularly in the remainder of this specification, including reference to the accompanying figures, in which.

Figure 1:
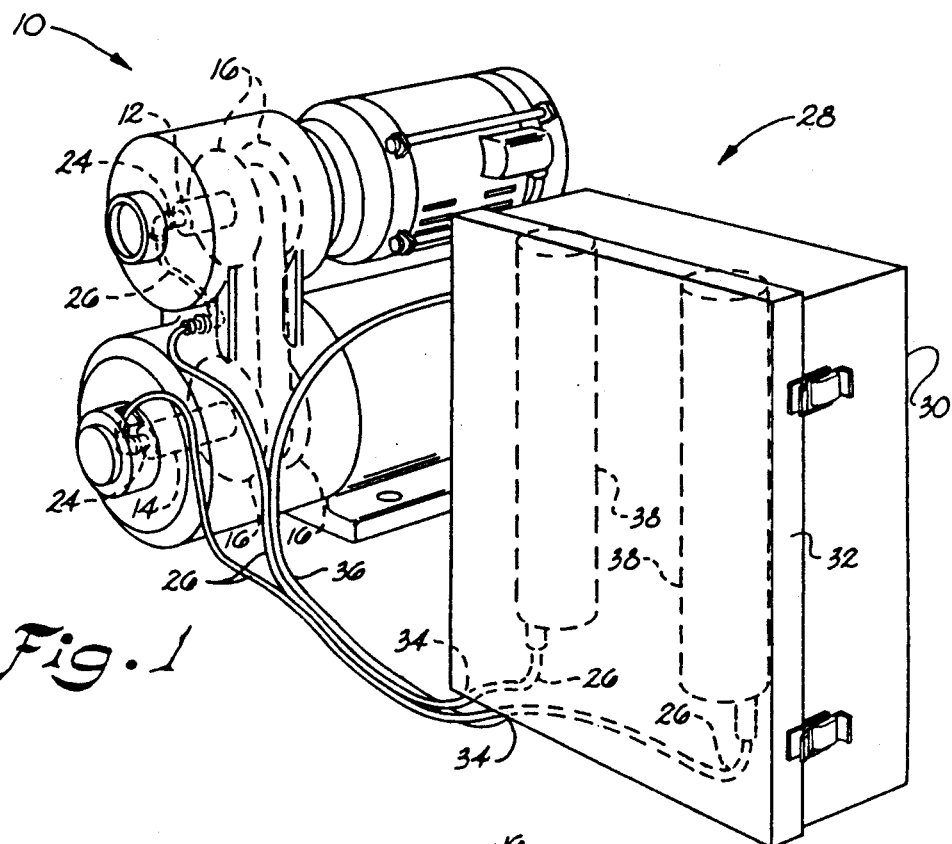
FIG. 1 illustrates a perspective view (in partial see-through) of an exemplary lubrication apparatus in accordance with the present invention, relatively remotely located from a device to be lubricated, which device incorporates an exemplary embodiment of an improved grease fitting in accordance with the present invention.

Repeat use of reference characters in the following specification and appended drawings is intended to represent the same or analogous features or elements of the present invention.

DETAILED DESCRIPTION OF THE PREFERRED EMBODIMENTS

Figure 2:
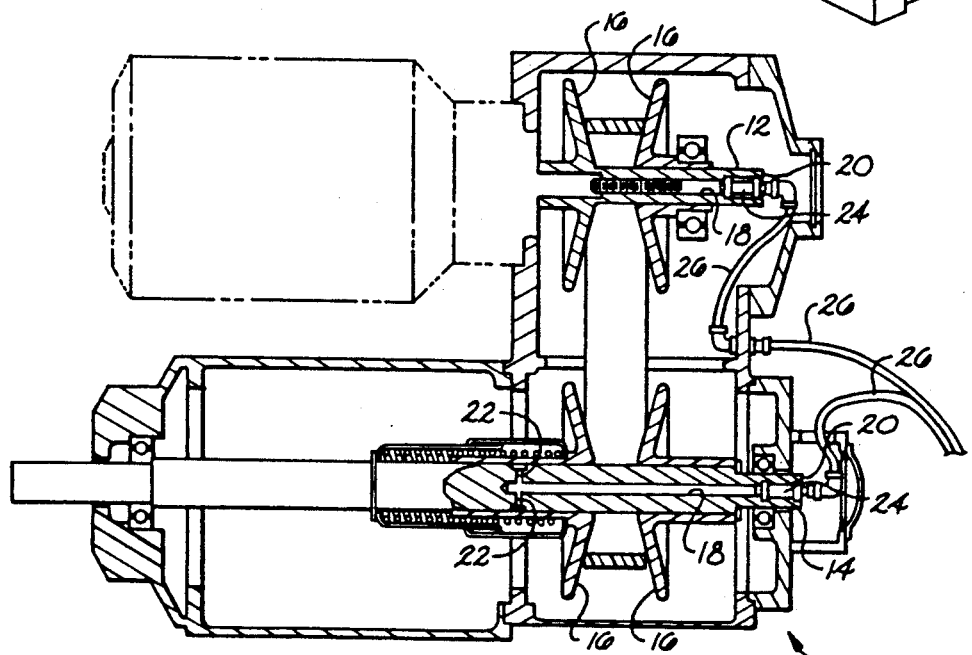
FIG. 2 illustrates a longitudinal cross-sectional view of the exemplary device to be lubricated as illustrated in FIG. 1, showing in greater detail the relationship thereof to an improved grease fitting apparatus in accordance with the present invention.

Preferred embodiments of this invention represented in present FIGS. 1 and 2 are for purposes of illustration only adapted for use with the REEVES MOTO-DRIVE Mechanical Adjustable Speed Drive (both REEVES and MOTODRIVE are registered Trademarks of Reliance Electric Corporation). However, it is to be well understood by one of ordinary skill in the art that features and aspects of the present invention may be practiced for the lubrication of numerous and various types of devices to be lubricated. Hence, present illustration of a mechanical adjustable speed drive merely serves as a convenient example of a device to be lubricated, and with which the present invention may be readily and advantageously practiced.

Mechanical adjustable speed drive 10 is one example of a device which preferably should be periodically lubricated, with a preferred lubrication schedule depending to a certain degree on the schedule of use thereof. General operation of drive 10 is disclosed in detail by the patents recited in the Background portion of this specification, which patents are incorporated herein by reference. Selected internal features of drive 10 and the remaining apparatus in FIG. 1 are illustrated in dotted line, while general external features thereof are in solid line.

In general, drive 10 includes a pair of rotatable shafts (or main shafts) 12 and 14 which support operative members thereon. In this instance, such operative members are variable discs 16 which function in drive 10 in a manner known to those of ordinary skill in the art without requiring further explanation. Discs 16 are fixedly received about their respective rotatable shafts 12 and 14, and rotate during operation of drive 10. In view of such rotation and corresponding friction created thereby (such as between the discs and the belt commonly entrained thereabout), periodic lubrication of the drive (particularly the disc surfaces) is desireable.

Conventionally, rotatable shafts 12 and 14 include central bores 18 into which grease may be introduced through standard grease fittings received adjacent respective outboard ends 20 thereof. Grease or other lubricants introduced into bores 18 may penetrate in inboard direction (i.e. away from ends 20) to lubricate the interior of drive 10 generally. Intersecting lubrication bores 22 or other features may cooperate with bores 18 in such lubrication.

In accordance with one aspect of the present invention, existing drives with standard grease fittings may be retrofit with lubrication apparatus in accordance with this disclosure. Such standard grease fittings (typically seated in the outboard ends 20 of rotatable shaft bores 18) are replaced with lubrication grease fittings 24 in accordance with this invention. Detailed exemplary embodiments of such grease fittings of the present invention are discussed further below with reference to present FIGS. 3 and 4. Exemplary grease fittings 24 of this invention may be adapted as represented in present FIGS. 1 and 2 for attachment (either temporary or relatively permanent) to tubing means 26 through which grease may be supplied to grease inputs of such lubrication apparatus 24. Alternatively, grease may be directly supplied thereto from a grease gun or similar manual article.

As discussed further below, grease fitting 24 is particularly adapted for permitting the application of grease thereto (with or without tubing means) even during rotation of respective rotatable shafts 12 or 14. In general, such advantageous feature is obtained by provision of an integral lube shaft located within bores 18 of main shafts 12 and 14. Preferably, such integral lube shaft is rotatably mounted within bore 18 so that a grease input thereof may remain relatively stationary even during rotation of the corresponding main shaft within which such integral lube shaft is received. Such features are detailed in present FIGS. 3 and 4, discussed below.

As more particularly represented by present FIG. 1, in accordance with further, alternative aspects of the present invention, grease may be relatively remotely supplied through tubing means 26 to grease fittings 24 of this invention from an automatic lubrication apparatus 28 in accordance with this invention. Apparatus 28 with tubing means 26 may also be used to automatically lubricate a standard type grease fitting, especially during periods whenever the corresponding device to be lubricated is not in operation. Such apparatus preferably (though not necessarily) includes a generally sealable housing 30 having a closeable cover 32. When used, such housing advantageously affords protection for the automatic lubrication apparatus enclosed therein, regardless of the surrounding environment of drive 10, or whatever the installation. Tubing means 26 pass through openings 34 defined in the otherwise enclosed housing, except that a similar opening may be provided for the introduction of a power cable or even a remote control cable 36 into housing 30.

Various lubrication apparatus embodiments in accordance with the present invention may be protectively received within housing 30, or otherwise disposed in operative relationship with grease fittings (either of the conventional type or in accordance with the present invention), or with tubing means. However, as generally represented by present FIG. 1, reservoir means 38 are provided for supplying grease to drive 10 via interconnection with tubing means 26. Examples of such reservoir means, and actuation means for controlling the output of grease therefrom, are discussed in detail below in conjunction with present FIGS. 5 and 6. A respective pair of such reservoir means and associated tubing means are illustrated in FIG. 1 merely for correspondence with the pair of grease fittings required for drive 10. Obviously, fewer or greater numbers of such elements and features of this invention may vary with given embodiments thereof.

Though for convenience of illustration present FIG. 1 represents automatic lubrication apparatus 28 as apparently relatively adjacent drive 10, such juxposition is considered relatively remote in the context of the present invention. In other words, the lubrication apparatus of this invention for supplying grease or equivalent lubricants to grease fitting 24 (or other grease fittings) are interconnected to such grease fittings through tubing means or their equivalents, i.e., through some means other than the direct "docking" of a manual device such as a grease gun tip to the grease fitting. Thus, those of ordinary skill in the art will appreciate that the term "relatively remote" in the context of the present invention would encompass apparently otherwise "close" positions as represented by present FIG. 1, or separations of up to 50 feet or more between drive 10 and apparatus 28. In general, the only limitation on the length of tubing means 26 is the practical pumping distance for a particular embodiment of apparatus 28. Tubing means 26 preferably comprises some plastic, rubber, or other form of flexible tubing though less flexible tubing such as copper or the like may be used. Even greatly shortened runs of means for interconnecting device 10 and apparatus 28 may constitute relatively remote placements in the above-explained context of the present invention.

More specific details of lubrication apparatus pertaining to a grease fitting in accordance with the present invention are discussed hereinafter with reference to FIGS. 3 and 4 (with FIG. 3 being a longitudinal cross-section of such features, and FIG. 4 being an exploded, perspective thereof). A main or rotatable shaft 40 includes a bore 42 into which grease may be introduced, as discussed above with reference to FIGS. 1 and 2. A grease fitting in accordance with this invention may be provided as original equipment with a given device, or as a retrofit thereto. For example, in a retrofit embodiment, bore 42 may be initially fitted with a conventional grease fitting at the outboard end 44 thereof. Typically, bore 42 will have a relatively smaller diameter (such as illustrated in section 46 thereof) extending to outboard end 44. The conventional grease fitting is preferably removed, and an outboard section in bore 42 thereafter enlarged to a diameter as illustrated in portion 48, which results in an inner shoulder 50 of bore 42.

Of course, a bore 42 with differing diameter portions 46 and 48 thereof may be originally provided in a device to be lubricated. In either retrofit or original equipment embodiments, bore 42 of main shaft 40 is fitted with an integral lube shaft 52, preferably having a central bore 54 extending coaxially along the length thereof and interconnecting between an inboard end 56 and an outboard end 58. Mounting threads 60 or equivalent features may be provided about end 58 for mating with tubing means 62 (discussed above in greater detail with reference to FIGS. 1 and 2). Alternatively, outboard end 58 may directly receive input from a conventional grease gun or the like.

Figure 3:
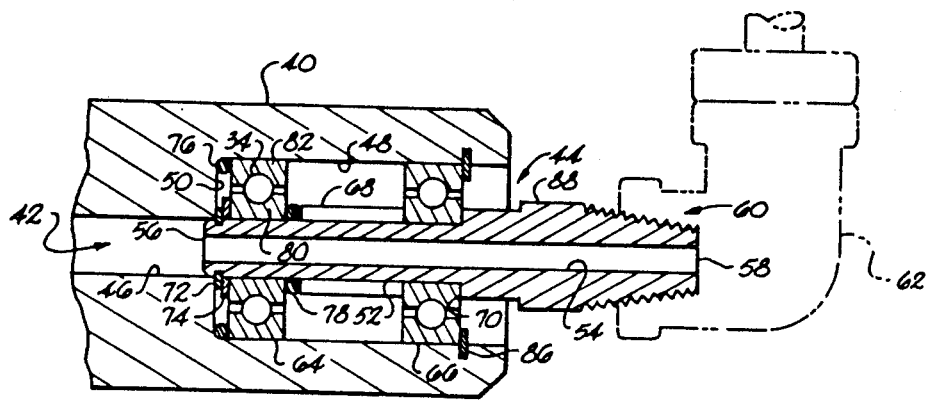
FIG. 3 illustrates an enlarged, cross-sectional view of another embodiment of an improved grease fitting (or lubrication apparatus) in accordance with the present invention, particularly for supplying grease to a given rotatable shaft.

In general, as illustrated by FIG. 3, outboard end 58 remains generally accessible while a portion of lube shaft 52 is received within rotatable shaft bore 42. Grease introduced through tubing means 62 (or with alternative means) enters outboard end 58 of lube shaft 52, traverses central bore 54 thereof, and exits inboard end 56 for lubricating main shaft 40.

To facilitate lubrication of main shaft 40 even during rotation thereof, lube shaft is rotatably supported in bore 42 by bearing means. In the preferred embodiment of present FIGS. 3 and 4, such bearing means includes a pair of bearing assemblies 64 and 66, preferably spaced at respective axial positions along lube shaft 52 so as to support such shaft at respective relative inboard and outboard portions of bore 42. Such separated support provides smooth rotatable action of shaft 40 relative shaft 52.

Spacing of bearing assemblies 64 and 66 may be variously accomplished in accordance with the present invention. In the illustrated exemplary embodiment, a generally cylindrical spacer member 68 is positioned about lube shaft 52 for such purpose. The position of the respective bearing assemblies relative lube shaft 52 is further determined by providing stepped sections along lube shaft 52. In particular, a shoulder 70 is defined on such shaft for receiving the outermost bearing assembly 66, while a retaining ring such as a snap ring 72 may be provided on a relatively inboard end 56 of shaft 52 for holding the bearing assemblies and spacer member 68 against shoulder 70. Snap ring 72 generally cooperates with an annular recess 73 defined in shaft 52.

A flat washer 74 or the like is received generally about the inside diameter of innermost bearing assembly 64 to cooperate therewith for establishing a labyrinth-type seal, which prevents the passage of grease towards the outboard side of the bearing means outside lube shaft 52. Another purpose of washer 74 is to prevent grease under pressure from purging itself back through the bearing means, which could damage the bearing means. An O-ring 76 may be provided adjacent the outside diameter of such bearing means also on its inboard side for further contributing to the sealing means function of washer 74. O-ring 76 is preferably slightly compressed against inner shoulder 50 of bore 42 whenever the lubrication apparatus in accordance with the present invention is fitted into such bore. A further O-ring 78 may optionally be provided on an outboard side of the inside diameter portion of bearing assembly 64 to back up flat washer 74. Whenever O-ring 78 is omitted, spacer member 68 is preferably extended to complete axial support between bearing assemblies 64 and 66.

Various alternatives may be practiced for rotatably supporting lube shaft 52 within bore 42, but sealed bearings are preferred. As generally known in the art, such bearing assemblies include an inner race 80 and an outer race 82 rotatably supported relative thereto with a plurality of entrained roller bearings 84. In this embodiment, preferably outer race 82 forms a slight interference fit with enlarged diameter portion 48 of bore 42, while the inside diameter of inner race 80 forms a slight interference fit with the outside diameter of lube shaft 52. In such construction, outer race 82 is free to rotate with rotatable shaft 40, while inner race 80 remains relatively stationary together with lube shaft 52. Thus, a permanently attached fixture such as tubing means 62 is accommodated for lubricating main shaft 40 even during rotation thereof.

A second snap ring 86 may be provided to further define retaining means for axially positioning lube shaft 52 relative shaft 40. Snap ring 86 may cooperate with the inside diameter of bore 42 and the outside diameter of bearing means, while retaining ring 72 cooperates as illustrated with other features to fix the position of such bearing means on lube shaft 52. Inboard end 56 of lube shaft 52 also cooperates with inner shoulder 50 of bore 42 for defining the axial position of the respective shafts, which is then secured by snap ring 86.

To further facilitate introduction and removal of lube shaft 52 from bore 42, a flatted axial portion 88 may be provided on shaft 52 adjacent the accessible free end 58 thereof. Further use of such flatted area, which is particularly adapted for engagement with a wrench or like device, may be made during fitting of tubing means 62 to threads 60 or the like.

Figure 4:
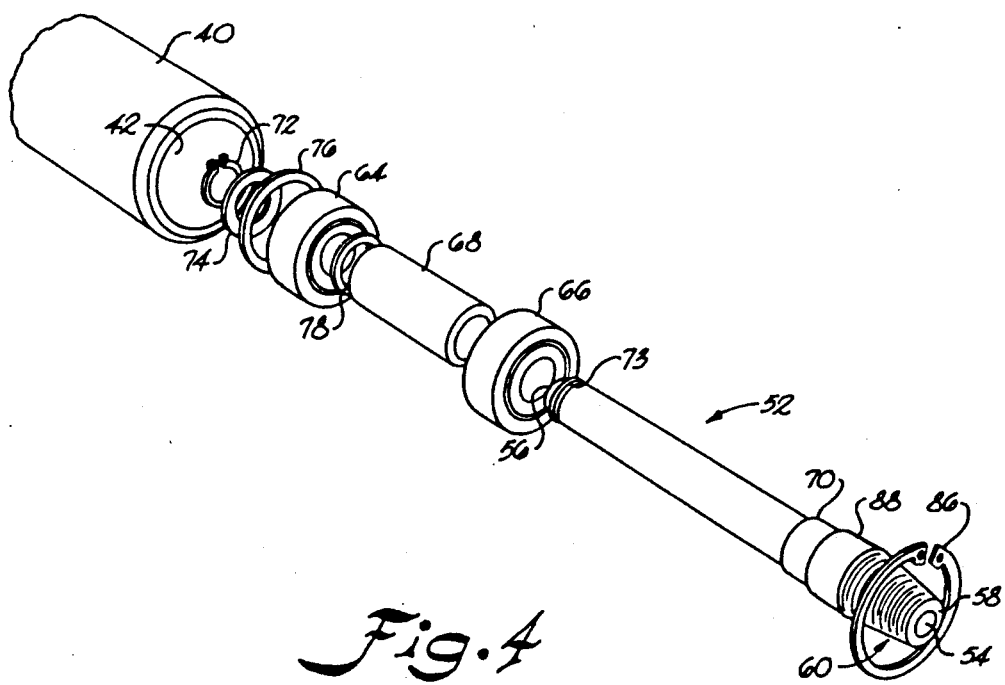
FIG. 4 illustrates an exploded, perspective view of the exemplary embodiment of the present invention as illustrated in present FIG. 3.

The foregoing exemplary structure of FIGS. 3 and 4 illustrates lubrication apparatus in accordance with the present invention which provides for either remote or direct lubrication of main shaft 40, even during rotation of such shaft. The relative rotation of lube shaft 52 and main shaft 40 is accomplished with bearing means. Both the bearing means and lube shaft are axially secured within bore 42 with retaining means, and the entire apparatus is sealed against grease leakage about the lube shaft by sealing means as discussed above.

While a preferred embodiment is illustrated by such FIGS. 3 and 4, modifications and variations thereto for accommodating specific installations may be practiced by those of ordinary skill in the art while still practicing the functions and obtaining the advantages outlined above. For example, the length of bore 42 from its outboard end 44 to its inner shoulder may be a little over one inch, with other features sized accordingly. Alternatively, such dimensions may vary widely to accommodate particular applications. Even the stepped features of bore 42 and shaft 52 may be altered by those of ordinary skill in the art to meet particular requirements, while practicing the present invention.

Figure 5:
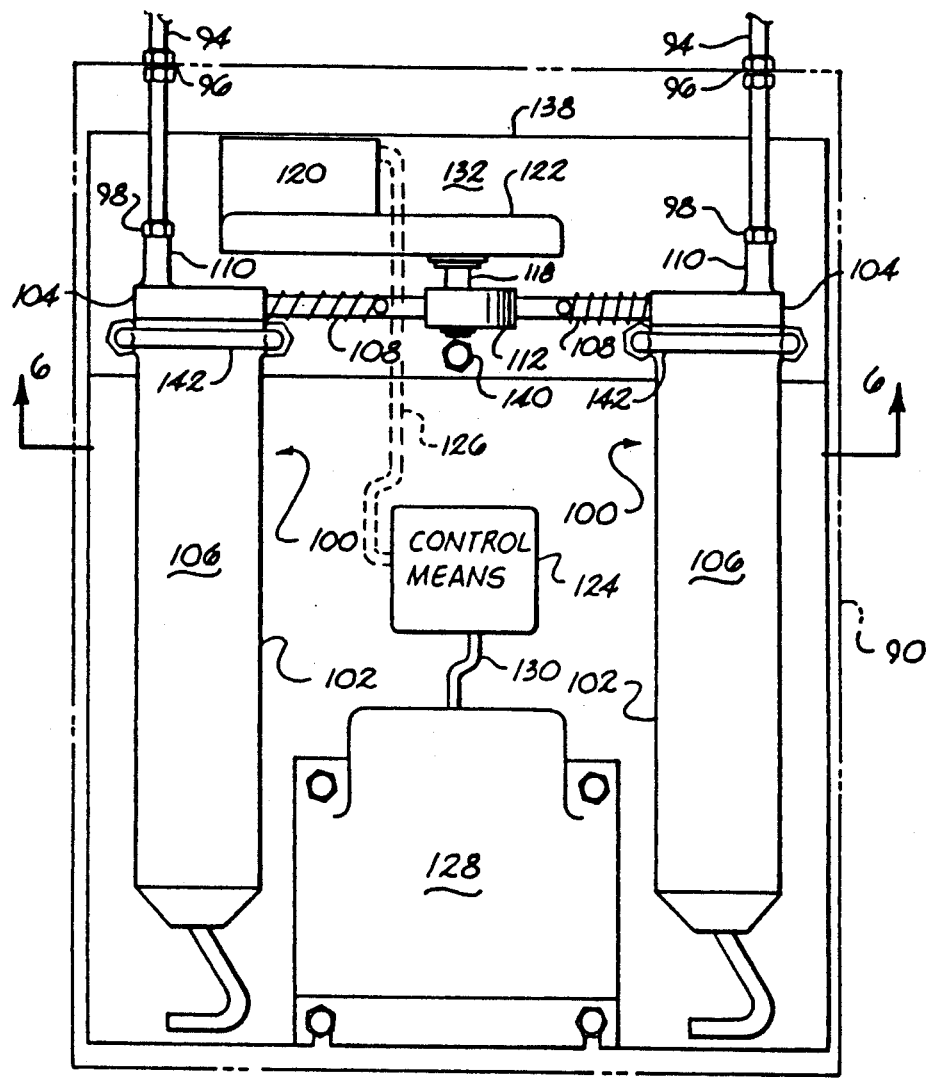
FIG. 5 illustrates a plan view of an automatic lubrication apparatus embodiment in accordance with further aspects of the present invention.
Figure 6:
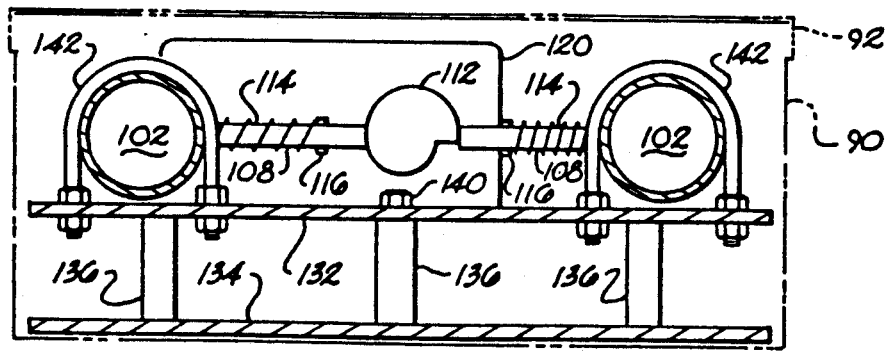
FIG. 6 illustrates a cross-sectional view of the exemplary apparatus as in present FIG. 5, as indicated by section line 6—6 therein.

Present FIGS. 5 and 6 more particularly concern features of the present invention directed to automatic lubrication apparatus, such as for automatically supplying grease through tubing means 62 or their equivalents to central bore 54 of lube shaft 52 (discussed above), or even to conventional grease fittings. To protect automatic lubrication apparatus in accordance with the present invention from any potentially adverse environmental conditions, such apparatus is preferably for the most part enclosed within a sealable housing 90 having a closeable top such as a hinged door 92 (all of which housing features are illustrated in dotted line in FIGS. 5 and 6). FIG. 5 illustrates in general diagrammatic form a plan view of apparatus contained within housing 90, with lid 92 thereof opened. FIG. 6 represents a sectional view of such apparatus taken along the line 6—6 as indicated in FIG. 5.

Tubing means 94 pass through housing 90 at defined openings 96 thereof. With threadable fittings 98 or the like, such tubing means directly connects at one end thereof to reservoir means 100, which upon actuation thereof pump grease through tubing means 94 to a device to be lubricated. Such reservoir means may comprise a variety of structures, such as conventional grease guns 102. An example of such grease guns suitable for incorporation into the present invention are the Stewart Warner Alemite A-400 grease guns, which have separable head portions 104 and body portions 106 to facilitate reloading of the body portions. Furthermore, such head portions incorporate piston-type actuators 108 for pumping grease from an output 110 thereof. Mechanized, controlled actuation of such piston members in accordance with the present invention is further discussed hereinbelow.

In general, where a pair of grease guns 102 are used (as illustrated in the presently preferred exemplary embodiment which is adapted for use with the twin lubrication points of device 10) a single rotatable cam 112 may be used for efficiently actuating both pistons 108. In particular, springs 114 surrounding pistons 108 and interconnected thereto with pins 116 form cam followers which follow the surface of cam 112. As understood by those of ordinary skill in the art, rotation of cam 112 about axis 118 thereof causes pumping action for grease guns 102 by actuation of their respective piston-type actuators. Variations in the surface of cam 112 may be used to establish desired pumping performance for grease guns 102.

Operation of rotatable cam 112 is under the control of its driving device, preferably in this embodiment a servo motor 120 and interconnecting gear drive 122. Virtually any controllable drive mechanism, or other actuating device, may be used in accordance with the present invention to control the outputting of grease from reservoir means 100. In the presently preferred embodiment, electronic control means 124 provides control output signals along line 126 to control operation of servo motor 120. In general, control circuits for establishing such output signals adequate to drive a servo motor are generally known to those of ordinary skill in the art. Accordingly, details thereof need not be repeated herewith for an understanding of the present invention.

Further in accordance with the present invention, such control means 124 preferably incorporates timer control means, which may be settable to cause operation of servo motor 120 for given periods of time at selected intervals. For example, servo motor 120 may be operated for a period of time such as 30 seconds at a selected interval such as 12 or 24 hours. The range of operation times and intervals therebetween which may be selected is virtually limitless, and to a considerable degree depends on the particular application of the present invention with a particular device to be lubricated and the needs of such device. Thus, those of ordinary skill in the art may by practicing the present invention establish such automatic lubrication times and intervals therebetween which are in their judgment appropriate for the devices to be lubricated.

Further in accordance with the present invention, control means 124 may alternately receive feedback relative operation of the device to be lubricated, or the environment thereof, for establishing further automatic lubrication. For example, housing 90 may incorporate a transformer 128 which receives electrical power as the device to be lubricated receives electrical power for energization thereof. Through electrical connection 130, control means 124 may be operated to automatically reset the timing of a predetermined interval of time with each such energization of the device to be lubricated. Alternatively, control means 124 may operate to cause operation of servo motor 124 for a given a period of time upon each such energization, all so that a desired regimen of lubrication for such device is established. Or, if tubing means 94 are not connected with a grease fitting which permits lubrication of its associated device during its operation, information relative energization of such device can be used to ensure automatic lubrication only during periods of nonenergization. Variations of such control to accommodate different desired lubrication regimens are intended to come within the spirit and the scope of the present invention.

As represented by incoming line 36 of FIG. 1, control means 124 may also be made responsive to remote control prompting for lubrication, either slaved to a master controller, or selectively input thereto by an operator. For example, if the device to be lubricated is on an off-shore drilling platform, an on-shore operator could override any pre-set regimen of operation for control means 124 and initiate a lubrication operation, all in accordance with the present invention.

As yet a further aspect of the present invention, a portion of automatic lubrication apparatus supported within housing 90 is preferably mounted on a movable planar member 132 which may be supported from a base member 134 by spacer members 136. In particular, a side edge 138 of planar member 132 may be pivotably supported relative the remainder of housing 90, so that upon removal of a locking means 140 (preferably comprising a single bolt threadably received in central spacer member 136), servo motor 120, gear drive 122, rotatable cam 112, and head portions 104 of grease guns 102 may be pivoted in common to facilitate removal and reloading of body portions 106 of such grease guns. U-bolts 142 or equivalent structures secure body portions 104 of the grease guns to such pivoting planar member 132. By the foregoing construction, simple removal of the single bolt 140 (or its equivalent) permits plate 132 to be tilted out from housing 90 for removal of the grease gun body portions. Thus, an automatic lubrication apparatus is provided which is particularly adapted for facilitating both protection of such apparatus during use, and for relatively simple reloading of reservoir means 100 thereof.

As further understood by those of ordinary skill in the art from the foregoing specification, various embodiments of the present invention may be directed solely to the lube shaft and corresponding structure illustrated in present FIGS. 3 and 4, solely to the automatic lubrication apparatus illustrated in present FIGS. 5 and 6, and combinations of such features as represented in the illustration of present FIG. 1. Moreover, it will be understood by those of ordinary skill in the art that the foregoing specification and drawings discussed with reference thereto are only exemplary embodiments of the present invention, with all such language being by way of example only. Use with particular drives, or to establish particular automatic lubrication regimens may be established for particular applications practiced bY those of ordinary skill in the art, all within the spirit and scope of the present invention. Moreover, individual features and aspects of the foregoing exemplary embodiments may be varied for accommodating such alternative applications, all without departing from the spirit of the present invention set forth in the appended claims.

What is claimed is:

1. A remote automatic lubrication system for use with grease fittings of devices to be lubricated, comprising:
   reservoir means for holding grease, said reservoir means including at least one grease output from which grease flows whenever said reservoir means is actuated, said reservoir means including at least one grease gun, having a piston actuated pump head;
   controllable actuation means, operatively associated with said reservoir means, for selectively actuating said reservoir means so as to output grease therefrom, said controllable actuation means including a motor driven cam positioned for selectively engaging the piston of said grease gun pump head, and further including control means for automatically controlling operation of such motor to drive said cam so as to periodically selectively lubricate a given device associated with said system; and grease conduit means for conducting grease flowing from said reservoir means grease output to a grease fitting relatively remote therefrom;

whereby a device having said grease fitting associated therewith may be selectively and automatically lubricated from said reservoir of grease located relatively remote therefrom.

2. A remote lubrication system as in claim 1, wherein said grease conduit means includes a length of tubing having respective, opposite ends, connected on one end thereof to a grease output of said grease gun pump head and adapted for attachment at the opposite end thereof to said grease fitting of said device to be lubricated, said tubing being up to 50 feet long, or more.

3. A remote lubrication system as in claim 1, wherein said control means includes timer means for variable control of the length of operation times and intervals therebetween for said cam-driving motor, whereby the length of lubrication time and intervals therebetween for said device having said grease fitting associated with said remote lubrication system is determined with setting of said timer means.

4. A remote lubrication system as in claim 3, wherein said control means further includes means for re-setting the timing interval of said timer means with each re-start of the device to be lubricated.

5. A remote lubrication system as in claim 3, wherein timer means includes means for setting the length of lubrication times within a range of from about 5 seconds to about 1 minute, and an interval of time between such lubrication times within a range of about 12 hours to about two weeks.

6. A remote lubrication system as in claim 1, wherein:

said reservoir means includes a pair of said grease guns situated with pistons thereof facing one another, said cam being situated between such facing pistons for common actuation of same; and wherein said remote lubrication system further includes springs disposed around the pistons of said respective grease gun heads, said springs being axially positioned on said piston with pins situated therein for ensuring that such pistons follow the shape of said cam during rotation thereof; and further wherein the shape of said cam may be varied to change the stroke action of said pistons so as to modify as desired the resulting grease pump action thereof.

7. A remote lubrication system as in claim 2, wherein said tubing comprises flexible tubing; and the grease fitting associated with said tubing includes an integral lube shaft rotatably mounted within the bore of a rotatable shaft so that such lube shaft remains stationary during rotation of the rotatable shaft thereabout, whereby even such a rotatable shaft may be controllably and remotely lubricated with said lubrication system.

8. An automatic lubrication system, comprising:

grease output means for outputting grease stored therein upon actuation thereof;

actuation means for selectively actuating said grease output means responsive to a control signal input thereto;

control timer means for outputting control signals to said actuation means at predetermined intervals, so as to actuate said grease output means for a given time at such intervals; and tubing means adapted for interconnecting grease output from said grease output means with a device to be lubricated, and which device is situated relatively remote from said grease output means, or to which device access is generally limited;

wherein the length of said predetermined intervals may be selected with said control timer means so as to automatically lubricate a relatively remotely-located or limited-access device at desired intervals;

wherein said grease output means includes a grease gun having a separable body and head portion, said head portion supporting thereon a cam-follower type actuating piston for pumping said grease gun; and said actuation means includes a rotatable cam disposed in operative association with said grease gun pumping piston for actuating same, and a servomotor for driving said rotatable cam.

9. An automatic lubrication system, comprising:

grease output means for outputting grease stored therein upon actuation thereof;

actuation means for selectively actuating said grease output means responsive to a control signal input thereto;

control timer means for outputting control signals to said actuation means at predetermined intervals, so as to actuate said grease output means for a given time at such intervals; and tubing means adapted for interconnecting grease output from said grease output means with a device to be lubricated, and which device is situated relatively remote from said grease output means, or to which device access is generally limited; wherein the length of said predetermined intervals may be selected with said control timer means so as to automatically lubricate a relatively remotely-located or limited-access device at desired intervals;

said grease output means including a grease gun having a separable body and head portion, said head portion supporting thereon a cam-follower type actuating piston for pumping said grease gun; and said actuation means including a rotatable cam disposed in operative association with said grease gun pumping piston for actuating same, and a servo motor for driving said rotatable cam; and wherein said system further comprises a generally sealable housing for substantially protectively enclosing said grease output means, said actuation means, and said control timer means, said housing further defining at least one opening therein for interconnection of said tubing means between said grease output means and a device to be lubricated; and a movable panel received within said housing, for commonly supporting said servo motor, said rotatable cam, and said grease gun head portion including the actuating piston thereof.

10. An automatic lubrication system as in claim 9, wherein:

said movable panel comprises a planar member pivotably supported within said housing, and having a single locking means to alternately permit pivoting thereof and securement relative said housing, whereby said grease gun head portion is rendered accessible for ready removal and re-filling of said grease gun body portion during pivoting of said planar member; and wherein said grease output means includes a pair of such grease guns mounted in parallel on said planar member, with U-bolts mounted on such member received about the respective grease gun head portions thereof.

11. An automatic lubrication system as in claim 9, further including a transformer received within said housing, said transformer being adapted for receiving power simultaneously with the device to be lubricated, and in turn supplying power to said control timer means which is automatically reset by application of power to such device to be lubricated with each energization thereof, whereby lubrication of such device is further automatically controlled.

12. An automatically lubrication system as in claim 8, wherein:

said control timer means includes means responsive to energization of the device to be lubricated for automatically outputting control signals for actuation of said grease output means for a given time at such energization; and said tubing means is adapted for interconnection with grease fitting means adapted for association with the bore of a rotatable shaft for the application of grease thereto, which grease fitting means includes a grease input which is relatively stationary even during rotation of such rotatable shaft.

13. An automatic lubrication system, comprising:

grease output means for outputting grease stored therein upon actuation thereof;

actuation means for selectively actuating said grease output means responsive to a control signal input thereto;

control timer means for outputting control signals to said actuation means at predetermined intervals, so as to actuate said grease output means for a given time at such intervals; and tubing means adapted for interconnecting grease output from said grease output means with a device to be lubricated, and which device is situated relatively remote from said grease output means, or to which device access is generally limited;

wherein the length of said predetermined intervals may be selected with said control timer means so as to automatically lubricate a relatively remotely-located or limited-access device at desired intervals; and a generally sealable housing for substantially protectively enclosing said grease output means, said actuation means, and said control timer means, said housing further defining at least one opening therein for interconnection of said tubing means between said grease output means and a device to be lubricated; and a movable panel received within said housing, for commonly supporting said actuation means and said grease output means.

* * * * *